United States Patent
Suzuki

(10) Patent No.: US 9,286,722 B2
(45) Date of Patent: Mar. 15, 2016

(54) INFORMATION PROCESSING APPARATUS, DISPLAY CONTROL METHOD, AND PROGRAM

(71) Applicant: Sony Corporation, Tokyo (JP)

(72) Inventor: Seiji Suzuki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 138 days.

(21) Appl. No.: 13/668,857

(22) Filed: Nov. 5, 2012

(65) Prior Publication Data

US 2013/0113789 A1    May 9, 2013

(30) Foreign Application Priority Data

Nov. 9, 2011   (JP) ................................ 2011-245305

(51) Int. Cl.
  *G06T 19/00*   (2011.01)
(52) U.S. Cl.
  CPC ........... *G06T 19/006* (2013.01); *G06T 2210/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0026272 | A1* | 10/2001 | Feld et al. ..................... | 345/419 |
| 2006/0202986 | A1* | 9/2006 | Okada et al. .................. | 345/419 |
| 2011/0025689 | A1* | 2/2011 | Perez et al. .................... | 345/420 |
| 2013/0038601 | A1* | 2/2013 | Han et al. ...................... | 345/419 |

FOREIGN PATENT DOCUMENTS

JP    2006-304331    11/2006

* cited by examiner

*Primary Examiner* — Maurice L McDowell, Jr.
(74) *Attorney, Agent, or Firm* — Hazuki International, LLC

(57) ABSTRACT

There is provided an information processing apparatus including a comparing unit comparing a size of at least one of virtual clothing or accessories based on dimensions set in advance and a size of a subject that has been captured; and a display control unit reshaping at least one of the virtual clothing or accessories in accordance with a comparison result produced by the comparing unit and displaying at least one of the reshaped virtual clothing or accessories overlaid on the subject.

16 Claims, 11 Drawing Sheets

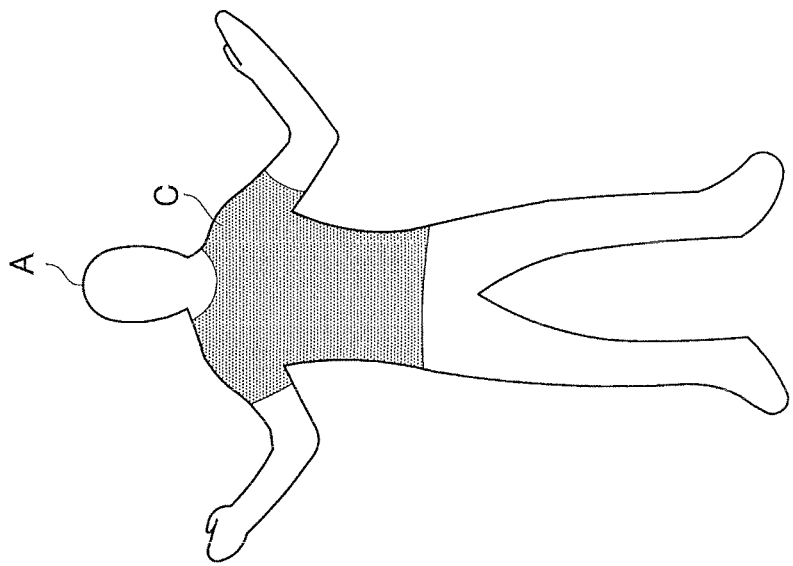
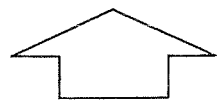
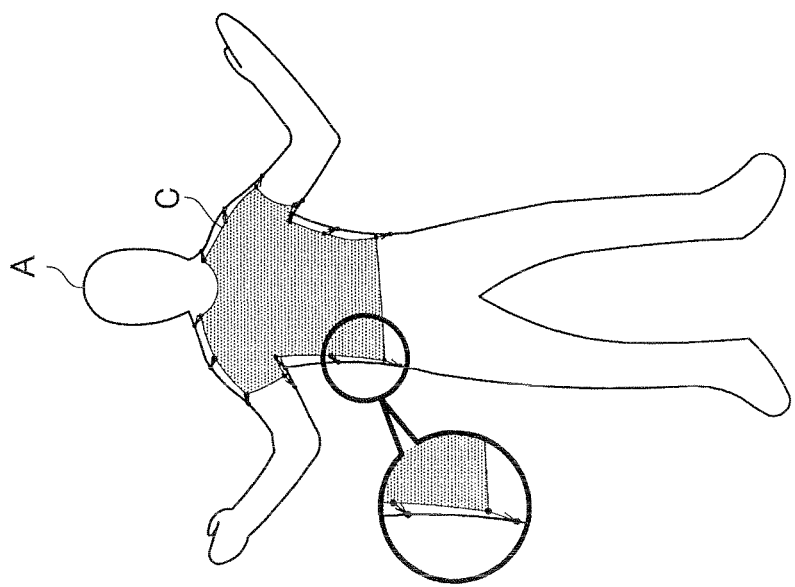
FIG. 9

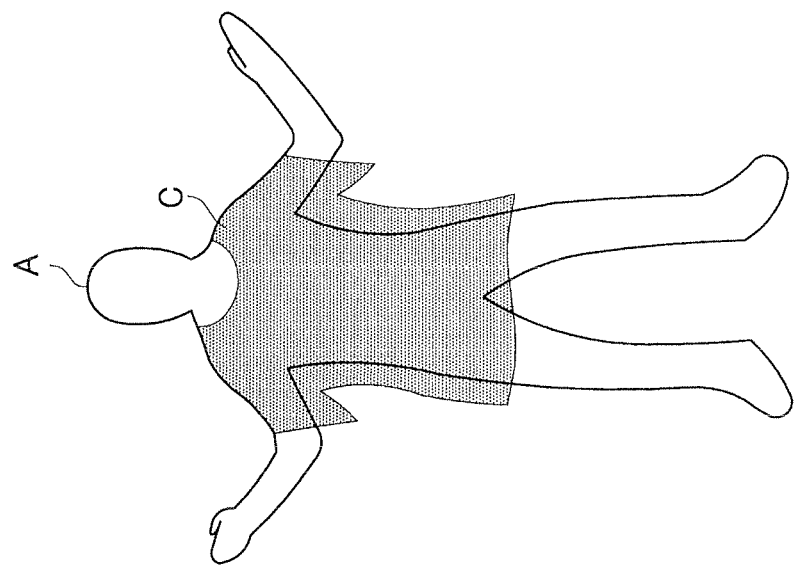
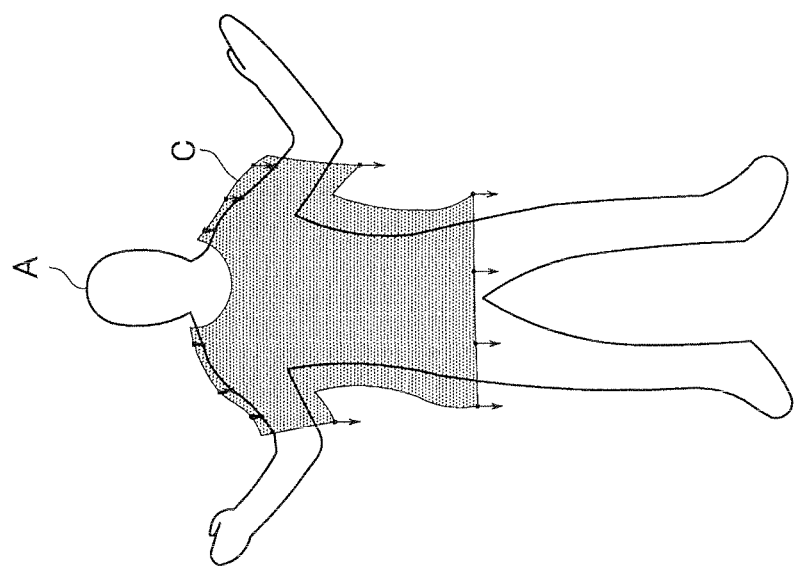
FIG. 10

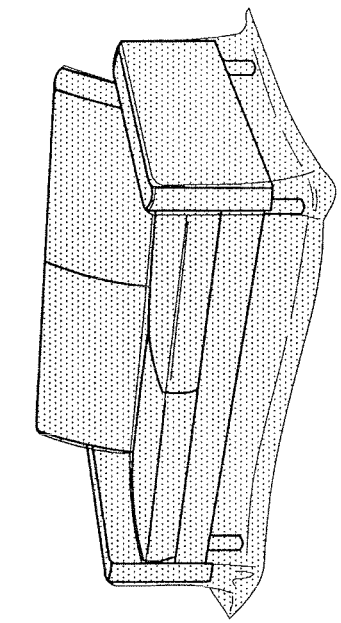
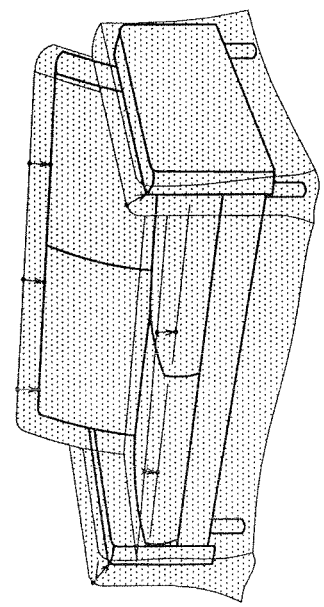
FIG. 11

INFORMATION PROCESSING APPARATUS, DISPLAY CONTROL METHOD, AND PROGRAM

BACKGROUND

The present disclosure relates to an information processing apparatus, a display control method, and a program.

Various technologies for generating dressing images (i.e., images in which clothes or the like are tried on) by superimposing images of clothing onto images produced by capturing a user have been proposed as virtual dressing systems.

As one example, Japanese Laid-Open Patent Publication No. 2006-304331 discloses a process that superimposes images of clothing onto an image of the user's body. More specifically, the image processing server disclosed in Publication No. 2006-304331 changes the size of a clothing image and adjusts the orientation of the image based on information such as body profile data (height, shoulder width, and the like) appended to a body image of the user and the orientation of the body in the image, and then superimposes the clothing image on the body image.

SUMMARY

A dressing image generating technology such as that disclosed in Publication No. 2006-304331 changes the size of a clothing image to be superimposed so as to match the size of the body based on body profile data.

With a virtual dressing system in which virtual clothing is overlaid and displayed in keeping with a user operation in a captured image, a clothing image that is larger or smaller than the body of the user in the image is displayed overlaid on the body with no modification. Alternatively, a clothing image is enlarged or reduced in keeping with an instruction given by the user and then overlaid and displayed without further modification.

However, in reality, clothing that is larger than the body will sag when tried on, while clothing that is smaller than the body will stretch. This means that the dressing images described above where a clothing image is merely superimposed on the body will appear unnatural to the viewer. Also, with a virtual dressing technology where clothing images are superimposed having been enlarged or reduced, it has been difficult for users to recognize the actual sizes of the clothes.

For this reason, the present disclosure aims to provide a novel and improved information processing apparatus, display control method, and program achieving a more natural representation that enables a user to intuitively recognize the difference in size between an object in a real space and a virtual object.

According to the present disclosure, there is provided an information processing apparatus including a comparing unit comparing a size of virtual clothing and/or accessories based on dimensions set in advance and a size of a subject that has been captured, and a display control unit reshaping the virtual clothing and/or accessories in accordance with a comparison result produced by the comparing unit and displaying the reshaped virtual clothing and/or accessories overlaid on the subject.

According to the present disclosure, there is provided a display control method including comparing a size of virtual clothing and/or accessories based on dimensions set in advance and a size of a subject that has been captured, and reshaping the virtual clothing and/or accessories in accordance with a comparison result and displaying the reshaped virtual clothing and/or accessories overlaid on the subject.

According to the present disclosure, there is provided a program causing a computer to execute a process comparing a size of virtual clothing and/or accessories based on dimensions set in advance and a size of a subject that has been captured, and a process reshaping the virtual clothing and/or accessories in accordance with a comparison result produced by the process of comparing and displaying the reshaped virtual clothing and/or accessories overlaid on the subject.

According to the embodiments of the present disclosure described above, it is possible to achieve a more natural representation that enables a user to intuitively recognize the difference in size between an object in a real space and a virtual object.

BRIEF DESCRIPTION OF THE DRAWINGS

FIG. 9 is a diagram useful in explaining reshaping of virtual clothing that is smaller than the subject;

FIG. 10 is a diagram useful in explaining reshaping of virtual clothing that is larger than the subject; and FIG. 11 is a diagram useful in explaining reshaping of a virtual sofa cover according to an embodiment of the present disclosure.

DETAILED DESCRIPTION OF THE EMBODIMENT(S)

Figure 1:
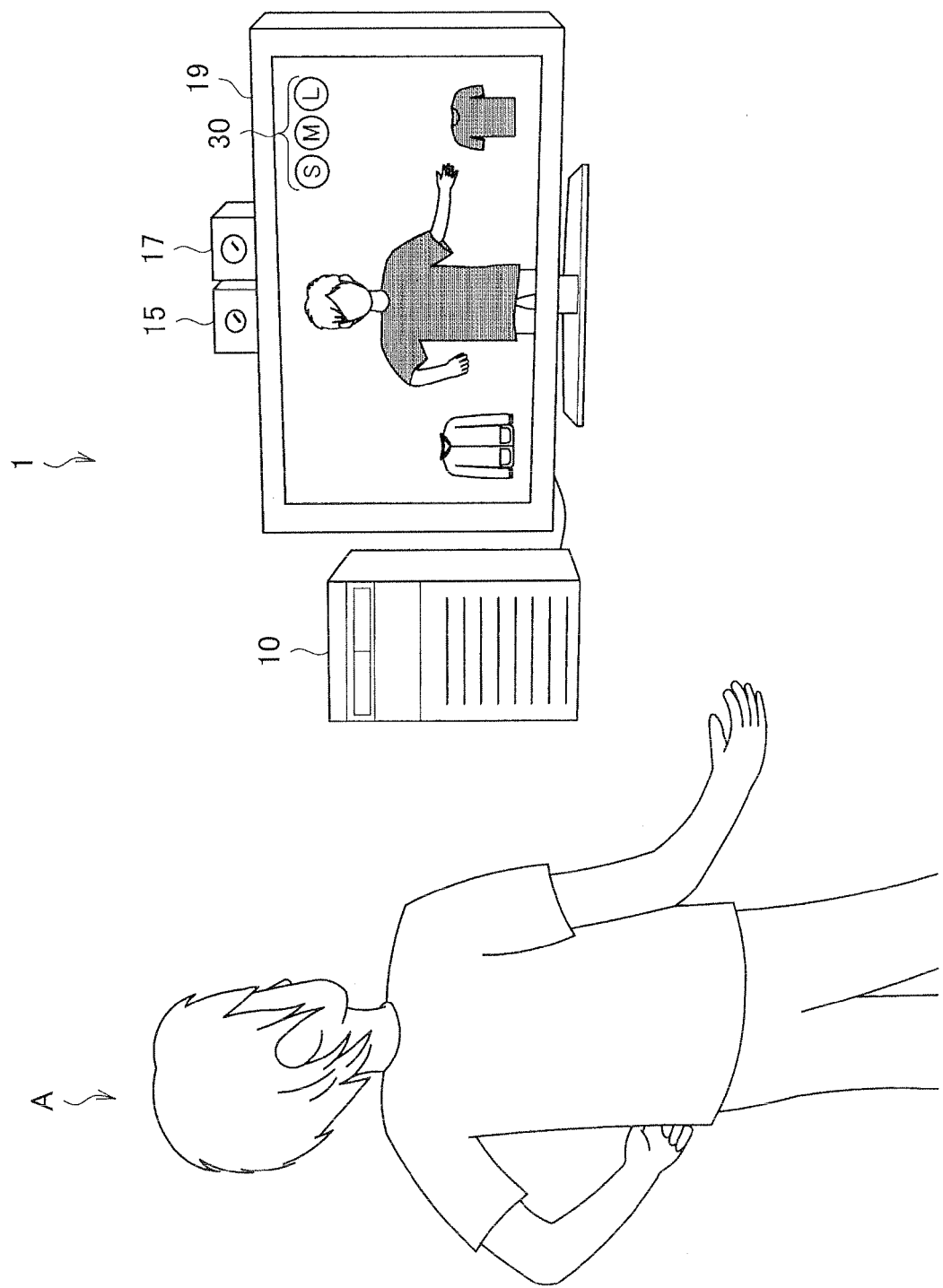
FIG. 1 is a diagram useful in explaining an overview of an AR dressing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview of AR Dressing System According to an Embodiment of the Present Disclosure
2. Configuration of Information Processing Apparatus
3. Display Control
   3-1. Fundamental Display Control
   3-2. Control for Reshaping Virtual Clothing
4. Conclusion 1. Overview of AR Dressing System According to an Embodiment of the Present Disclosure In recent years, attention has been focused on a technology called augmented reality (AR) that presents additional information to the user by overlaying such information onto the real world. The information presented to the user by AR technology is visualized using virtual objects of a variety of forms, such as text, icons, and animations. One of the main uses of AR technology is to support user activities in the real world. In the following description, AR technology is applied to a dressing system (i.e., a system for trying on clothes and the like).

By displaying an image of virtual clothing overlaid on the body in keeping with a user operation, a dressing system that uses AR technology enables a user to virtually try on clothes in real time. An AR dressing system according to the an embodiment of the present disclosure reshapes virtual clothing based on a comparison result for the size of the subject, which is an object in a real space, and the size of virtual clothing, which is a virtual object, and displays the reshaped virtual clothing overlaid on the subject. By doing so, more natural-looking AR dressing images can be displayed, which enable the user to intuitively recognize the difference in size between the object in the real space and the virtual object.

An overview of the AR dressing system according to the present embodiment of the disclosure will now be described with reference to FIG. 1. As shown in FIG. 1, an AR dressing system 1 according to the present embodiment of the disclosure includes an information processing apparatus 10, a camera 15, a sensor 17, and a display apparatus 19. Note that there are no particular limitations on the location where the AR dressing system 1 is set up. As examples, the AR dressing system 1 may be set up in the user's home or may be set up in a store.

Also, although the plurality of apparatuses that compose the AR dressing system 1 (that is, the information processing apparatus 10, the camera 15, the sensor 17, and the display apparatus 19) are configured as separate devices in the example shown in FIG. 1, the configuration of the AR dressing system 1 according to the present embodiment is not limited to this. For example, any combination of a plurality of apparatuses that compose the AR dressing system 1 may be integrated into a single apparatus. As another example, the plurality of apparatuses that compose the AR dressing system 1 may be incorporated into a smartphone, a PDA (personal digital assistant), a mobile phone, a mobile audio reproduction device, a mobile image processing device, or a mobile game console.

The camera (image pickup apparatus) 15 picks up images of an object present in a real space. Although there are no particular limitations on the object present in the real space, as examples such object may be an animate object such as a person or an animal or an inanimate object such as a garage or a television stand. In the example shown in FIG. 1, as the object present in a real space, the subject A (for example, a person) is captured by the camera 15. Images picked up by the camera 15 (hereinafter also referred to as "picked-up images") are displayed on the display apparatus 19. The picked-up images displayed on the display apparatus 19 may be RGB images. Also, the camera 15 sends the picked-up images to the information processing apparatus 10.

The sensor 17 has a function for detecting parameters from the real space and sends detected data to the information processing apparatus 10. For example, if the sensor 17 is constructed of an infrared sensor, the sensor 17 is capable of detecting infrared waves from the real space and supplying an electrical signal in keeping with the detected amount of infrared as the detected data to the information processing apparatus 10. As one example, the information processing apparatus 10 is capable of recognizing the object present in the real space based on the detected data. The type of the sensor 17 is not limited to an infrared sensor. Note that although the detected data is supplied from the sensor 17 to the information processing apparatus 10 in the example shown in FIG. 1, the detected data supplied to the information processing apparatus 10 may be images picked up by the camera 15.

The information processing apparatus 10 is capable of processing the picked-up images, such as by superimposing a virtual object on the picked-up images and/or reshaping the picked-up images, in keeping with a recognition result for the object present in the real space. The display apparatus 19 is also capable of displaying the images processed by the information processing apparatus 10.

For example, as shown in FIG. 1, the information processing apparatus 10 is capable of recognizing the subject A in the real space and displaying dressing images in which a clothing image is superimposed on the display apparatus 19 in real time. In this example, the user's body is video of the real space and images of clothing to be tried on are a virtual object displayed by being overlaid on the video of the real space. By doing so, the AR dressing system 1 provides a virtual dressing room in real time.

Figure 2:
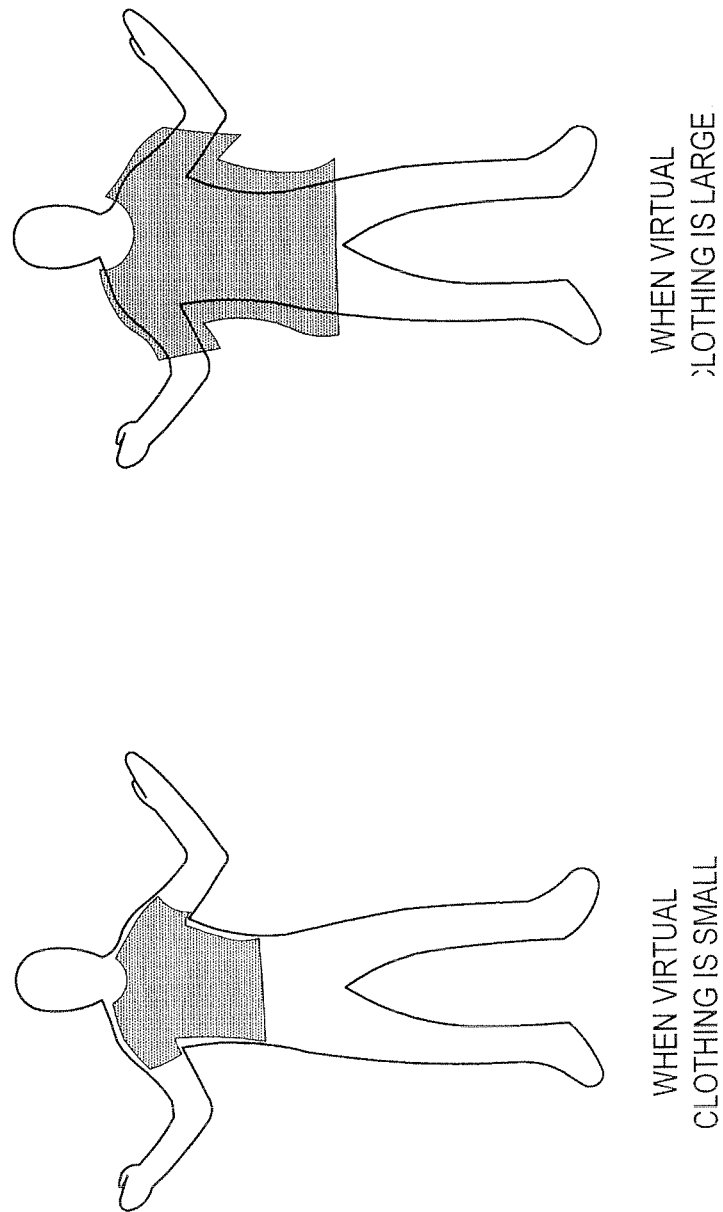
FIG. 2 is a diagram useful in explaining cases where virtual clothing has been superimposed without modification by a normal virtual dressing system.

Here, in a normal virtual dressing system, virtual clothing to be displayed by being overlaid on a subject has been overwritten on the subject with no size adjustment (i.e., with the size of the virtual clothing larger or smaller than the subject). FIG. 2 is a diagram useful in explaining a case where virtual clothing is superimposed without modification by such a normal virtual dressing system.

As shown on the left in FIG. 2, if virtual clothing is superimposed in a state where the virtual clothing is smaller than the subject in a picked-up image, the region of the subject will stick out from the virtual clothing. However, in reality, when clothes that are smaller than the body are tried on, the clothes will stretch, which means that dressing images like that shown on the left in FIG. 2 are unnatural.

Also, as shown on the right in FIG. 2, if virtual clothing is superimposed in a state where the virtual clothing is larger than the subject in a picked-up image, since the region of the virtual clothing is larger than the subject, the virtual clothes will float above the shoulders of the subject and will not sag. However, in reality, when clothes that are larger than the body are tried on, the clothes as a whole will sag, which means that dressing images like that shown on the right in FIG. 2 are unnatural and lack realism.

Also, as described earlier, if a clothing image is enlarged or reduced and then superimposed on a picked-up image (body image) without further modification, the clothing image may be adjusted to a size that is unrelated to the sizes of actual existing clothes. However, when a virtual dressing system is used by a user who is considering whether to purchase existing clothes, such as when clothes are purchased via the Internet, it is necessary to generate dressing images that take the sizes of existing clothes into consideration.

For this reason, with the AR dressing system according to the present embodiment of the disclosure, a virtual object (here, virtual clothing) is reshaped based on a comparison result for the size of an object (here, a captured subject) in a real space and the size of the virtual object and is then displayed overlaid on the subject. For example, as shown in FIG. 1, by reshaping an image of virtual clothing to be displayed overlaid on the subject A so that the virtual clothing as a whole sags in the direction of gravity, it becomes possible for the subject A to intuitively recognize that the size of the virtual clothing is larger than the subject A's own body. Note that as shown in FIG. 1, the subject A is capable of arbitrarily selecting the size of the virtual clothing from a size icon group 30, such as "S", "M", and "L" displayed on the display apparatus 19. By doing so, the subject A is capable of virtually trying on virtual clothing of various sizes.

2. Configuration Of Information Processing Apparatus

Figure 3:
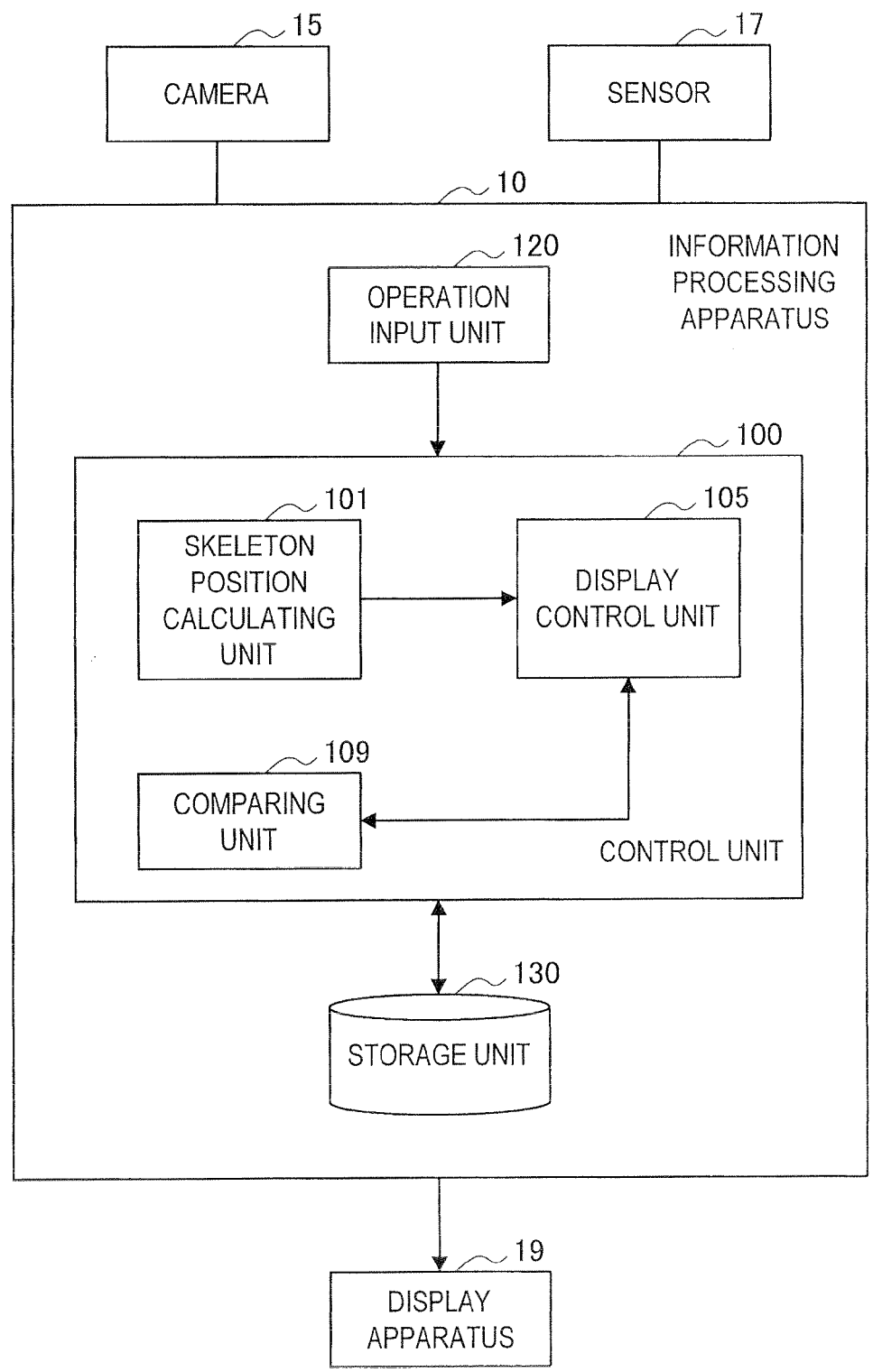
FIG. 3 is a block diagram showing the configuration of an information processing apparatus according to the embodiment of the present disclosure.

Next, the configuration of the information processing apparatus 10 that realizes the AR dressing system according to the present embodiment of the disclosure will be described with reference to FIG. 3. As shown in FIG. 3, the information processing apparatus 10 includes a control unit 100, an operation input unit 120, and a storage unit 130. The control unit 100 includes a skeleton position calculating unit 101, a display control unit 105, and a comparing unit 109. The information processing apparatus 10 is also connected wirelessly or via wires to the camera 15, the sensor 17, and the display apparatus 19.

The control unit 100 corresponds to a processor such as a CPU (Central Processing Unit) or a DSP (Digital Signal Processor). By executing a program stored in the storage unit 130 or another storage medium, the control unit 100 realizes the variety of functions of the control unit 100, described later, Note that the respective blocks that compose the control unit 100 may all be incorporated in the same apparatus or some of such blocks may be incorporated in another apparatus (such as a server).

The storage unit 130 stores a program and data for processing by the information processing apparatus 10 using a storage medium such as a semiconductor memory or a hard disk. As one example, the storage unit 130 stores a program for causing a computer to function as the control unit 100. The storage unit 130 may also store data to be used by the control unit 100, for example. The storage unit 130 according to the present embodiment stores three-dimensional data for clothing and/or accessories as virtual objects to be displayed. The storage unit 130 according to the present embodiment stores size information for clothing and/or accessories in association with three-dimensional data for the clothing and/or accessories. The expression "size information" refers to actual dimension information on the clothing and/or accessories such as length, shoulder width, (body) width, sleeve length, and sleeve width. Such actual dimension information may be stored in centimeter units. The actual dimension information may be stored for each size (such as S, M, and L) of the clothing and/or accessories. Note that in the present specification, the expression "clothing and/or accessories" can include clothes and accessories. Here, the expression "accessories" includes eyeglasses, hats, belts, and the like.

The operation input unit 120 includes an input device, such as a mouse, a keyboard, a touch panel, a button or buttons, a microphone, a switch or switches, a lever or levers, or a remote controller, that enables the user to input information, an input control circuit that generates an input signal based on an input made by the user and outputs to the control unit 100, and the like. By operating the operation input unit 120, it is possible for the user to turn the power of the information processing apparatus 10 on and off and to give instructions such as launching an AR dressing system program.

The camera 15 (image pickup apparatus) generates picked-up images by capturing a real space using an image pickup element such as a CCD (Charge Coupled Device) or a CMOS (Complementary Metal Oxide Semiconductor). Although the camera 15 is assumed to be constructed separately to the information processing apparatus 10 in the present embodiment of the disclosure, the camera 15 may be part of the information processing apparatus 10.

Figure 4:
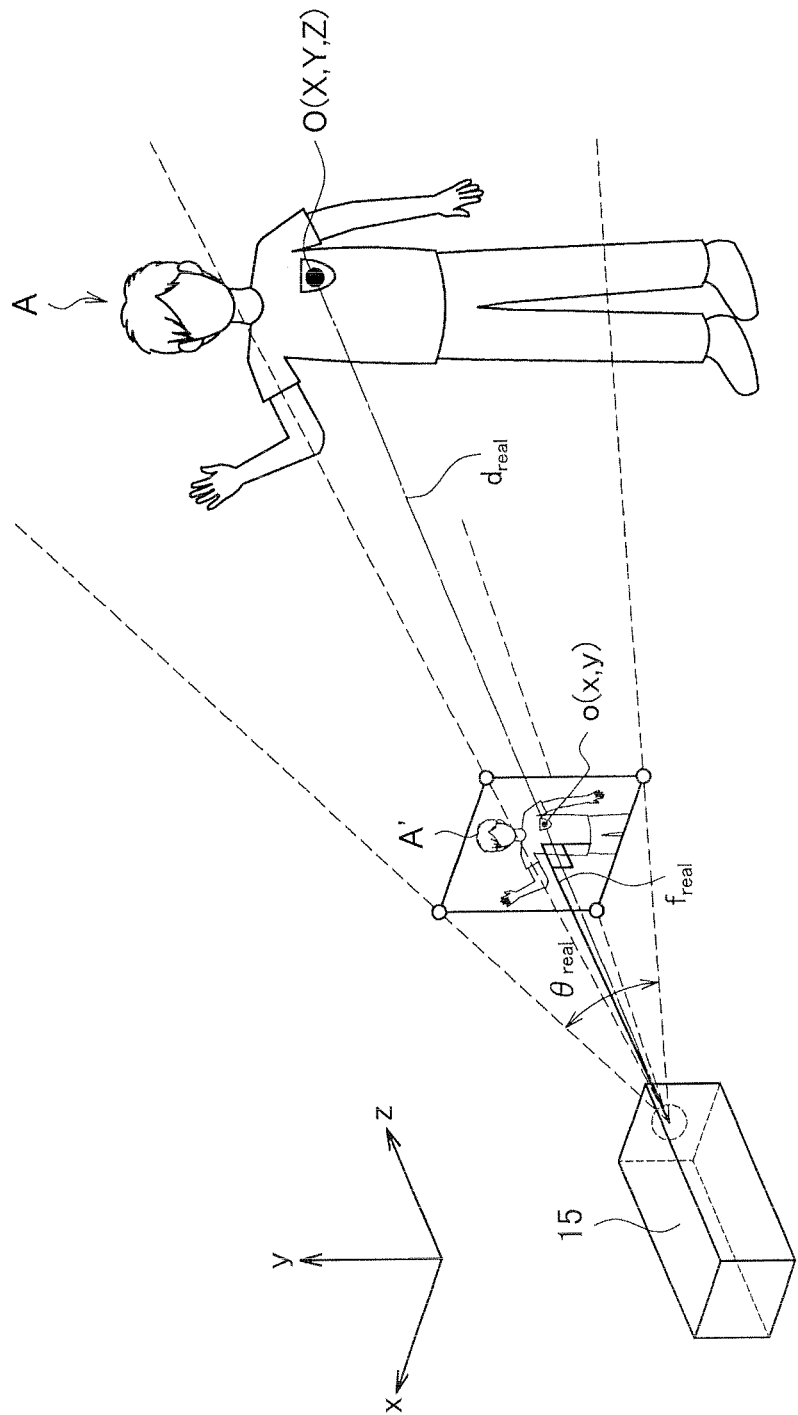
FIG. 4 is a diagram useful in explaining the positional relationship between a camera and a subject in a real space and a picked-up image in which the subject is captured.

The camera 15 also supplies settings information of the camera 15 used during image pickup to the control unit 100. FIG. 4 is a diagram useful in explaining the positional relationship between the camera 15 and the subject A in the real space and a picked-up image A' produced by capturing the subject A. For ease of illustration, in FIG. 4 the focal distance $f_{real}$ from the principal point that is the optical center of the lens (not shown) of the camera 15 to the image pickup element (also not shown) of the camera 15 and the picked-up image A' (which is two-dimensional with xy coordinates) of the subject A (which is three-dimensional with xyz coordinates) produced on the image pickup element are shown on the same side as the subject. As described later, the distance $d_{real}$ from the camera 15 to the subject A is calculated as depth information. The angle of view $\theta_{real}$ of the camera 15 is mainly decided according to the focal distance $f_{real}$. As an example of the settings information of the camera 15, the camera 15 supplies the focal distance $f_{real}$ (or the angle of view $\theta_{real}$) and the resolution (that is, the number of pixels) of the picked-up image A' to the information processing apparatus 10.

The sensor 17 has a function for detecting parameters from the real space. As one example, if the sensor 17 is constructed of an infrared sensor, the sensor 17 is capable of detecting infrared from the real space and supplying an electrical signal in keeping with the detected amount of infrared as detected data to the information processing apparatus 10. The type of sensor 17 is not limited to an infrared sensor. Note that if an image picked up by the camera 15 is supplied to the information processing apparatus 10 as the detected data, the sensor 17 does not need to be provided.

The display apparatus 19 is a display module constructed of an LCD (Liquid Crystal Display), an OLED (Organic Light-Emitting Diode), a CRT (Cathode Ray Tube) or the like. Although a configuration where the display apparatus 19 is constructed separately to the information processing apparatus 10 is imagined in the present embodiment of the disclosure, the display apparatus 19 may be part of the information processing apparatus 10.

Next, the functional configuration of the control unit 100 mentioned above will be described. As described earlier, the control unit 100 includes the skeleton position calculating unit 101, the display control unit 105, and the comparing unit 109.

Skeleton Position Calculating Unit 101

The skeleton position calculating unit 101 calculates the skeleton position of the body appearing in a picked-up image based on the detected data. There are no particular limitations on the method of calculating the skeleton position in the real space of the object appearing in a picked-up image. As one example, the skeleton position calculating unit 101 first recognizes a region in which an object is present in the picked-up image (also referred to as the "object-present region") and acquires depth information of the object in the picked-up image. The skeleton position calculating unit 101 may then recognize the parts (head, left shoulder, right shoulder, torso, and the like) in the real space of the object appearing in the picked-up image based on the depth and form (feature amounts) of the object-present region and calculate center positions of the respective parts as the skeleton position. Here, the skeleton position calculating unit 101 is capable of using a feature amount dictionary stored in the storage unit 130 to compare feature amounts decided from a picked-up image with feature amounts for each part of an object registered in advance in the feature amount dictionary and thereby recognize the parts of the object included in the picked-up image.

Various methods can be conceivably used to recognize the object-present region. For example, if a picked-up image is supplied to the information processing apparatus 10 as detected data, the skeleton position calculating unit 101 can recognize the object-present region based on differences between a picked-up image before the object appears and a picked-up image in which the object appears. In more detail, the skeleton position calculating unit 101 is capable of recognizing a region in which the difference between a picked-up image before the object appears and a picked-up image in which the object appears exceeds a threshold as the object-present region.

As another example, if parameters detected by the sensor 17 have been supplied to the information processing apparatus 10 as the detected data, the skeleton position calculating unit 101 is capable of recognizing the object-present region based on the detected data. In more detail, the skeleton position calculating unit 101 is capable of recognizing a region in which the detected amount of infrared exceeds a threshold as the object-present region.

Various methods can be conceivably used to acquire the depth information of an object in a picked-up image. For example, it is possible to decide the distance between the camera 15 and the object in advance. That is, it is possible to set a limitation that the object is disposed at a position a distance decided in advance away from the camera 15. If such a limitation is provided, it is possible for the skeleton position calculating unit 101 to treat the depth information of the object (here, the distance between the camera 15 and the object) as a fixed value (for example, 2m).

The skeleton position calculating unit 101 is also capable of calculating the depth information of the object in a picked-up image based on parameters calculated by the sensor 17. In more detail, if the skeleton position calculating unit 101 emits light such as infrared toward the object from an emitter device (not shown), it will be possible to calculate depth information for the object in the picked-up image by analyzing the light detected by the sensor 17.

As another example, the skeleton position calculating unit 101 is capable of calculating the depth information of the object in a picked-up image based on a phase delay of light detected by the sensor 17. This method is sometimes referred to as TOF (Time Of Flight). Alternatively, if the light emitted from an emitter device (not shown), is composed of a known pattern, the skeleton position calculating unit 101 may calculate the depth information of the object in a picked-up image by analyzing the degree of distortion of the pattern constructed by the light detected by the sensor 17.

Note that an image pickup apparatus with a function for calculating depth information of an object in a picked-up image is referred to as a depth camera and can be realized by a stereo camera or a laser range scanner. The skeleton position calculating unit 101 may acquire the depth information from a depth camera that is connected to the information processing apparatus 10.

Based on the depth and form (feature amounts) of the object-present region acquired by the methods described above, the skeleton position calculating unit 101 recognizes the parts (head, shoulders, and the like) in the real space of the object appearing in a picked-up image and calculates the skeleton position of the respective parts. Skeleton information including the skeleton position of at least one part that constructs the subject A calculated by the skeleton position calculating unit 101 will now be described with reference to FIG. 5.

Figure 5:
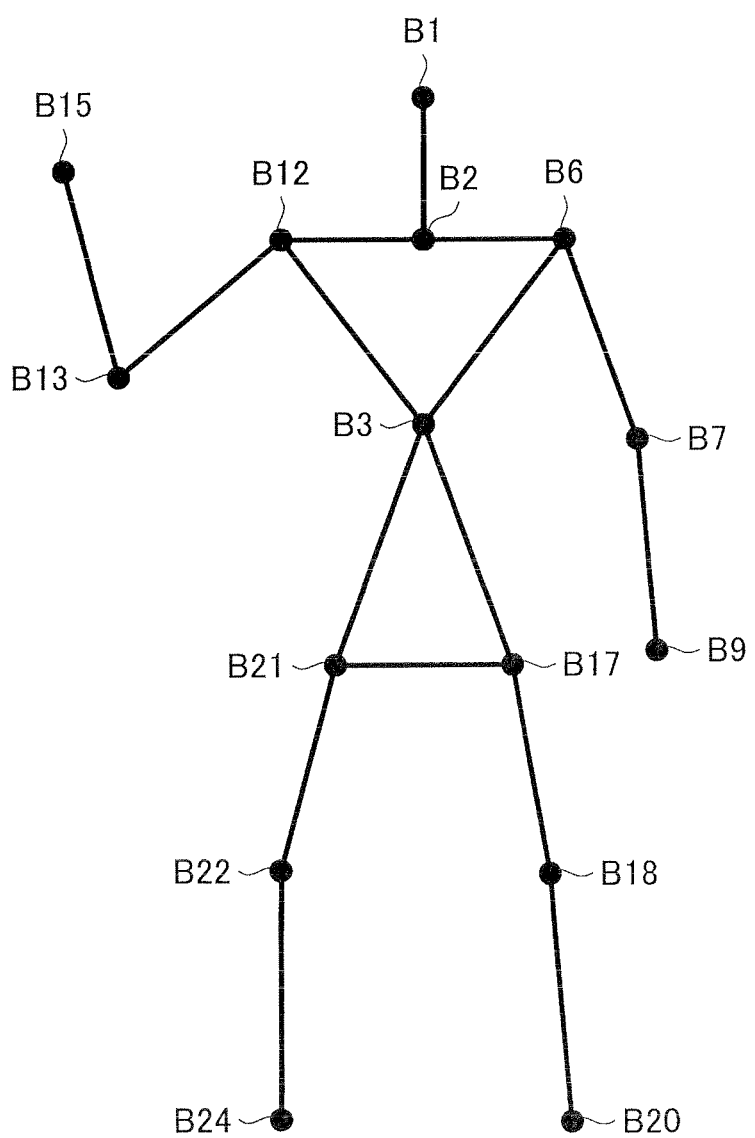
FIG. 5 is a diagram useful in explaining skeleton information according to the embodiment of the present disclosure.

FIG. 5 is a diagram useful in explaining skeleton information including skeleton positions (coordinates) of at least one part that constructs the subject A. Although the coordinates B1 to B3, B6, B7, B9, B12, B13, B15, B17, B18, B20 to B22, and B24 showing the positions of fifteen parts that construct the subject A are given as one example of the skeleton information in FIG. 5, there are no particular limitations on the number of parts included in the skeleton information.

Note that the coordinates B1 show coordinates of the "Head", the coordinates B2 show coordinates of the "Neck", the coordinates B3 show coordinates of the "Torso", the coordinates B6 show coordinates of the "Right Shoulder", and the coordinates B7 show coordinates of the "Right Elbow". Additionally, the coordinates B9 show coordinates of the "Right Hand", the coordinates B12 show coordinates of the "Left Shoulder", the coordinates B13 show coordinates of the "Left Elbow", and the coordinates B15 show coordinates of the "Left Hand".

The coordinates B17 show coordinates of the "Right Hip", the coordinates B18 show coordinates of the "Right Knee", the coordinates B20 show coordinates of the "Right Foot", and the coordinates B21 show coordinates of the "Left Hip". The coordinates B22 show coordinates of the "Left Knee" and the coordinates B24 show coordinates of the "Left Foot".

The skeleton position calculating unit 101 according to the present embodiment acquires depth information for an object in a picked-up image as described earlier, and as a specific example the depth information may be acquired from the depth camera described above as a picked-up image (not shown) in which shading changes in accordance with the depth.

Comparing Unit 109

The comparing unit 109 compares the size of virtual clothing and/or accessories (here, virtual clothing) based on size information (i.e., dimensions set in advance) and the size of the subject A that has been captured and outputs a comparison result to the display control unit 105. Note that there are various conceivable methods for the comparing of sizes carried out by the comparing unit 109 according to the present embodiment, and there are no particular limitations on such method.

For example, a method that compares the sizes of the subject A and the virtual clothing on a two-dimensional level may be used. More specifically, the comparing unit 109 first carries out segmentation in pixel units of the region of the subject A from a picked-up image to generate a subject mask image in which a part corresponding to the subject A is colored white and other parts are colored black. Next, a clothing mask image in which parts where the virtual clothing to be displayed overlaid on the subject A is drawn are colored white and other parts where the virtual clothing is not drawn are colored black is generated. Note that the region where the virtual clothing is to be displayed overlaid on the subject A may be decided based on a virtual image C' acquired by having virtual clothing C that is disposed in accordance with the skeleton position of the subject A in a virtual space (described later) rendered by a virtual camera 25. The virtual clothing C disposed in the virtual space is generated based on three-dimensional data modeled in advance and size information (actual dimensions such as length, shoulder width and (body) width).

After this, the comparing unit 109 compares the areas (i.e., numbers of pixels) between "a region that is white in the subject mask image and is black in the clothing mask image" and "a region that is black in the subject mask image and is white in the clothing mask image" and outputs a comparison result to the display control unit 105.

Note that the "region that is white in the subject mask image and is black in the clothing mask image" is a region that is within the region of the subject A but where virtual clothing is not drawn. Also, the "region that is black in the subject mask image and is white in the clothing mask image" is a region that is outside of the region of the subject A and is where virtual clothing is drawn.

Accordingly, if the "region that is white in the subject mask image and is black in the clothing mask image" is larger, the virtual clothing can be said to be smaller than the subject A. Meanwhile, if the "region that is black in the subject mask image and is white in the clothing mask image" is larger, the virtual clothing can be said to be larger than the subject A.

Also, a method that compares the sizes of the subject A and the virtual clothing on a three-dimensional level may be used. More specifically, the comparing unit 109 recognizes actual dimensions (in centimeter units, for example) of the subject A, as examples the height, the shoulder width, and the (body) width based on three-dimensional coordinates of feature points showing features of the form of the subject A (see, for example, the coordinates O in FIG. 4). Note that the comparing unit 109 may calculate the feature points (three-dimensional coordinates) of the subject A using the depth information described earlier.

Next, the comparing unit 109 extracts size information (as examples, actual dimensions, such as the length, the shoulder width, and the (body) width, expressed in centimeter units for example) of the virtual clothing C to be displayed overlaid on the subject A from the storage unit 130.

The comparing unit 109 then compares the actual dimensions, such as the height, shoulder width, and the like, of the subject A and the actual dimensions, such as length, body width, and the like, of the virtual clothing C, and outputs a comparison result to the display control unit 105.

Display Control Unit 105

The display control unit 105 carries out control that generates an AR dressing image where virtual clothing is displayed overlaid on a subject appearing in a picked-up image and has the AR dressing image displayed on the display apparatus 19. By reshaping the virtual clothing C to be displayed overlaid on the subject A based on the comparison result outputted from the comparing unit 109, the display control unit 105 according to the present embodiment is capable of achieving a more natural representation of when clothes are actually tried on. More specifically, if the virtual clothing C is larger than the subject A, the display control unit 105 causes the virtual clothing C to sag downward as a whole in the direction of gravity. Conversely, if the virtual clothing C is smaller than the subject A, the display control unit 105 reshapes the virtual clothing C so that the virtual clothing C stretches so as to match the size of the subject A.

Figure 6:
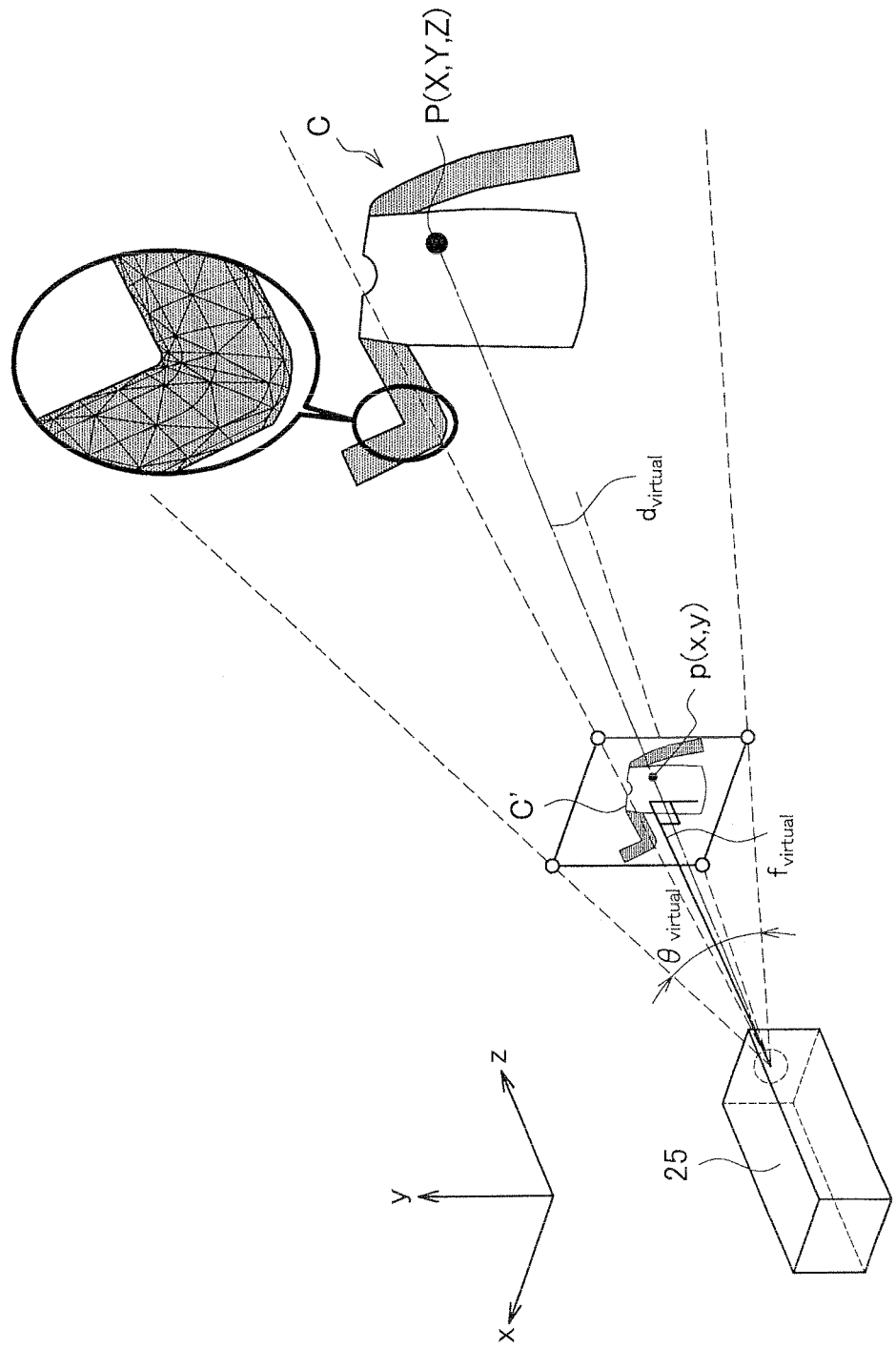
FIG. 6 is a diagram useful in explaining the positional relationship between a virtual camera and virtual clothing in a virtual space and a virtual clothing image produced by projecting the virtual clothing.

Here, generation of the virtual clothing to be overlaid on the picked-up image will be described with reference to FIG. 6. FIG. 6 is a diagram useful in explaining the positional relationship between the virtual camera 25 and the virtual clothing C in the virtual space and the virtual clothing image C' (also referred to as the "virtual image") produced by projecting (rendering) the virtual clothing C. In FIG. 6, in the same way as the picked-up image A' produced by capturing the real space shown in FIG. 4, the rendered virtual clothing image C' is shown on same side as the virtual clothing.

The settings (internal parameters) of the virtual camera 25 are decided in accordance with the settings (internal parameters) of the camera 15 that captures the real space. The expression "settings (internal parameters) of the camera" may for example be focal distance f, angle θ, and number of pixels. The display control unit 105 sets the settings of the virtual camera 25 so as to match the camera 15 of the real space (this process is also referred to as "initialization").

Next, based on the depth information of the object in the picked-up image, the display control unit 105 disposes the virtual clothing C in accordance with the skeleton position of the subject at a position that is separated from the virtual camera 25 by a distance $d_{virtual}$ that is the same as the distance $d_{real}$ from the camera 15 to the subject A in the real space. The display control unit 105 may generate the virtual clothing C based on three-dimensional data that has been modeled in advance. As shown in FIG. 6, for example, the display control unit 105 is capable of representing the three-dimensional form of the virtual clothing in a more realistic manner by constructing the surfaces of the virtual clothing C from a set of triangular polygons. If the skeleton position of the subject A changes over time, the display control unit 105 is capable of changing the position of the virtual clothing C so as to track the skeleton position.

In addition, if the display control unit 105 according to the present embodiment generates the virtual clothing C based on three-dimensional data modeled in advance, size information stored in association with three-dimensional data of the virtual clothing C is used. Note that when there is a plurality of sizes (such as S, M, and L) of the virtual clothing C, the display control unit 105 may display a size icon group 30 such as that shown in FIG. 1 and have the subject A select an arbitrary size.

Next, the display control unit 105 acquires the clothing image C' (or "virtual image") by rendering, that is, projecting the three-dimensional virtual clothing C to produce a two-dimensional flat image using the virtual camera 25. The display control unit 105 can then generate the AR dressing image by displaying the virtual clothing image C' overlaid on the picked-up image A' (see FIG. 4).

Here, as described earlier, by reshaping the virtual clothing C to be displayed overlaid on the subject A based on the comparison result outputted from the comparing unit 109, the display control unit 105 according to the present embodiment produces a more natural representation of when clothes are actually tried on. As one example, the display control unit 105 achieves a more natural representation by acquiring points (feature points) on the outline of the virtual clothing C and points (feature points) on the outline of the subject A that are closest to such points and moving the feature points of the virtual clothing C to the feature points of the subject A or in the direction of gravity. Note that display control of an AR dressing image by the display control unit 105 will be described in more detail next in the "3. Display Control" section.

This completes the detailed description of the configuration of the information processing apparatus 10 that realizes the AR dressing system according to the present embodiment of the disclosure. Next, display control for an AR dressing image by the information processing apparatus 10 will be described.

3. Display Control 3-1. Fundamental Display Control

Figure 7:
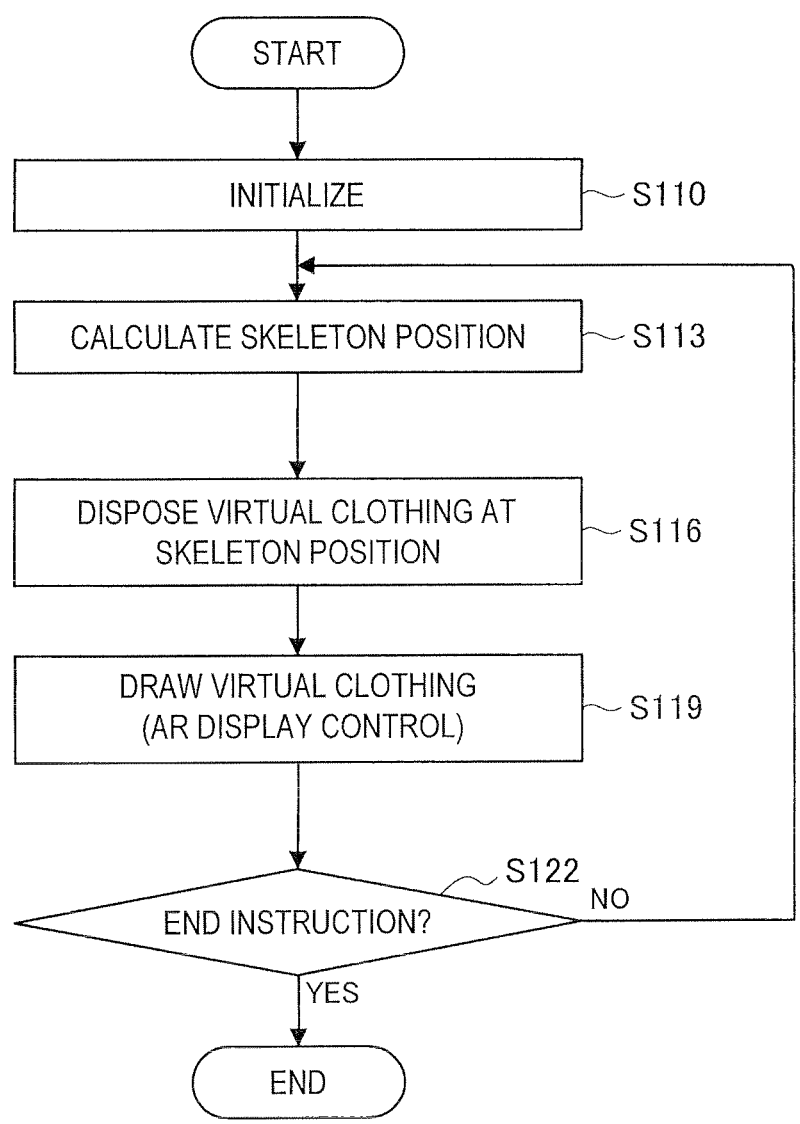
FIG. 7 is a flowchart showing a fundamental display control process for displaying an AR dressing image according to the embodiment of the present disclosure.

FIG. 7 is a flowchart showing the fundamental display control process for an AR dressing image carried out by the information processing apparatus 10. As shown in FIG. 7, first, in step S110, the display control unit 105 carries out initialization to make the settings of the virtual camera 25 in the virtual space match the settings of the camera 15 in the real space.

Next, in step S113, the skeleton position calculating unit 101 calculates the skeleton position (xyz coordinates) of the subject A in the real space that has been captured and outputs the skeleton position to the display control unit 105.

After this, in step S116, the display control unit 105 disposes the virtual clothing C in a virtual space in accordance with the skeleton position (xyz coordinates) of the subject A.

Next, in step S119, the display control unit 105 carries out control (AR display control) that renders the virtual clothing C to acquire the clothing image C' (virtual image), draws the AR dressing image by superimposing the clothing image C' on the picked-up image A', and displays the picked-up image A' on the display apparatus 19.

In step S122, the information processing apparatus 10 repeatedly carries out step S113 to S119 until an end instruction is given. By doing so, the information processing apparatus 10 is capable of providing AR dressing images that track the movement of the subject A in real time.

This completes the description of the fundamental display control process. In addition, the information processing apparatus 10 according to the present embodiment is capable of comparing the sizes of the subject A and the virtual clothing C and reshaping the virtual clothing C to be displayed overlaid on the subject A. A specific example of control for reshaping the virtual clothing by the present embodiment will now be described with reference to FIG. 8.

3-2. Control for Reshaping Virtual Clothing

Figure 8:
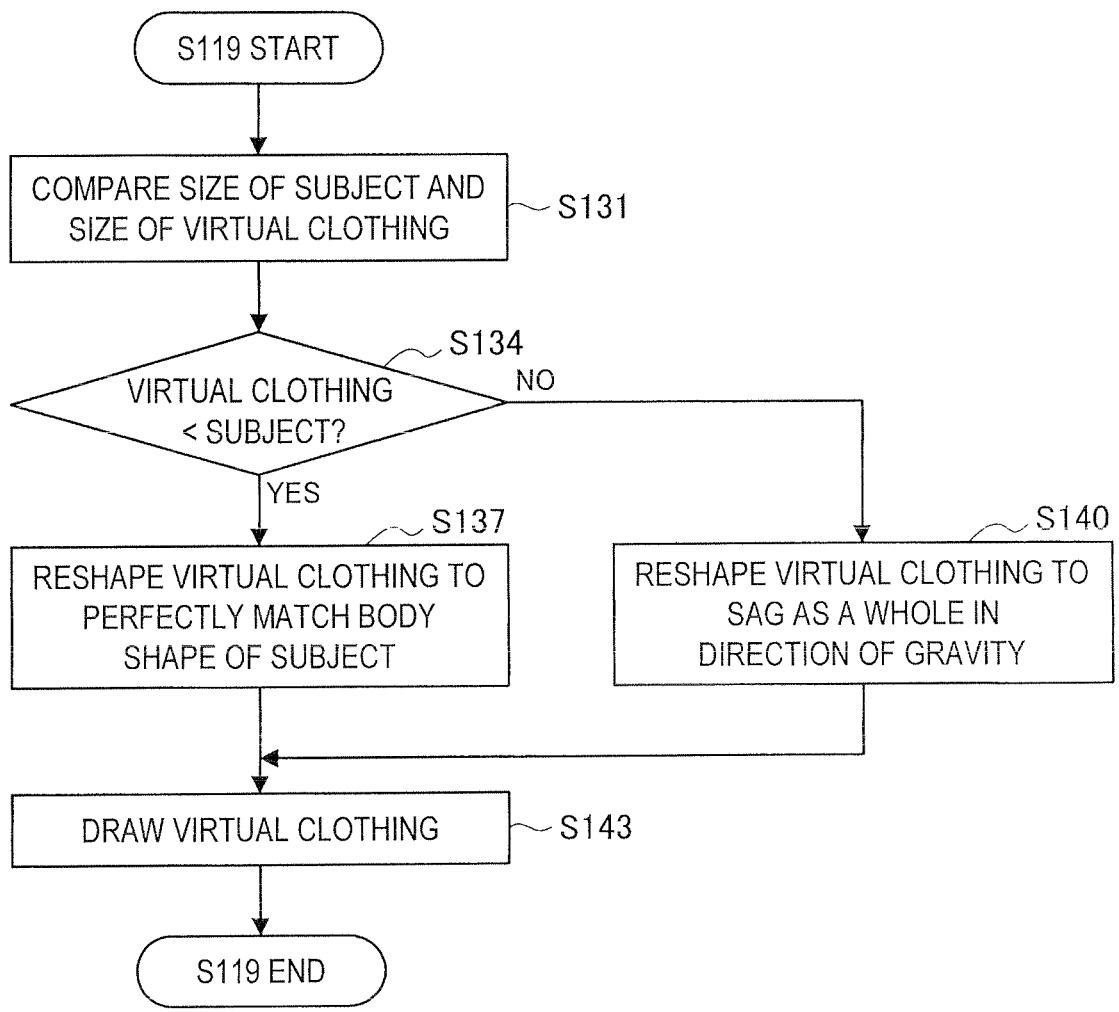
FIG. 8 is a flowchart showing a process for reshaping virtual clothing according to the embodiment of the present disclosure.

FIG. 8 is a flowchart showing a reshaping process for virtual clothing carried out by the information processing apparatus 10 according to the present embodiment. More specifically, in FIG. 8, during the AR display control of step S119 shown in FIG. 7, a reshaping process for the virtual clothing C to be displayed overlaid on the subject A is carried out based on the comparison result for the size of the subject A and the size of the virtual clothing C.

First, in step S131 in FIG. 8, the comparing unit 109 compares the size of the subject A and the size of the virtual clothing C to be displayed overlaid on the subject A.

After this, if in step S134 the comparison result produced by the comparing unit 109 is that the virtual clothing C is smaller than the subject A, in step S137 the display control unit 105 reshapes the virtual clothing C so as to perfectly match the body shape of the subject A.

Meanwhile, if in step S134 the comparison result produced by the comparing unit 109 is that the virtual clothing C is larger than the subject A, in step S140 the display control unit 105 reshapes the virtual clothing C so that the virtual clothing C as a whole sags downward in the direction of gravity (downward in the vertical direction).

After this, in step S143, the display control unit 105 generates an AR dressing image by drawing the virtual clothing C, which has been reshaped based on the comparison result produced by the comparing unit 109, superimposed on the subject A.

This completes the description of the reshaping process for the virtual clothing C according to the present embodiment. Next, reshaping the virtual clothing in steps S137 and S140 described earlier will be described using specific examples.

Example Reshaping 1

In step S137 described above, if the virtual clothing C is smaller than the subject A, the display control unit 105 reshapes the virtual clothing C so as to perfectly match the body shape of the subject A. Specific display control will now be described with reference to FIG. 9.

As shown in FIG. 9, by moving points (feature points) on the outline of the virtual clothing C to points (feature points) on the outline of the subject A that are close to such feature points, the display control unit 105 reshapes the virtual clothing C so as to perfectly match the body shape of the subject A. When doing so, the display control unit 105 may carry out movement while supplementing feature points within the region of the virtual clothing C in accordance with movement of the feature points on the outline of the virtual clothing C.

In this way, by reshaping the virtual clothing C so that the virtual clothing C perfectly matches the body shape of the subject A and displaying the virtual clothing C overlaid on the subject A, it is possible to provide more natural AR dressing images that enable the user to recognize that the size of the virtual clothing C is smaller than the subject A and resemble a state where the clothes are actually tried on.

Example Reshaping 2

In step S140 described above, if the virtual clothing C is larger than the subject A, the display control unit 105 reshapes the virtual clothing C so as to sag downward as a whole in the direction of gravity (i.e., vertically downward). Specific display control will now be described with reference to FIG. 10.

As shown in FIG. 10, although points (feature points) on the outline of the virtual clothing C are moved in the direction of gravity, if the outline of the subject A, such as the shoulder, is below a feature point of the virtual clothing C, the virtual clothing C is moved as far as feature points on the outline of the subject A. Also, if there is no outline of the subject A below the feature points of the virtual clothing C, such as at a hem, the feature points on the outline of the virtual clothing C are moved vertically downward so as to represent sagging.

In this way, by reshaping the virtual clothing C so that the virtual clothing C sags as a whole and displaying the virtual clothing C overlaid on the subject A, it is possible to provide more natural AR dressing images that enable the user to recognize that the size of the virtual clothing C is larger than the subject A and resemble a state where the clothes are actually tried on.

Note that the display control unit 105 may exaggerate the sagging of the clothes by representing greater sagging that would be expected to happen with actual clothes. By exaggerating the sagging, it is possible to more prominently express that the size of the virtual clothing C is large. More specifically, by increasing the distance moved vertically downward by feature points such as the hem of the virtual clothing C beyond the expected distance, it is possible to exaggerate the sagging of the clothes.

This completes the specific description of reshaping the virtual clothing C based on Example Reshaping 1 and Example Reshaping 2 described above. Note that reshaping of the virtual clothing C by moving the feature points may be realized by moving feature points (two-dimensional coordinates (x,y)) on the clothing image C' acquired through rendering by the virtual camera 25. Alternatively, reshaping may be realized by moving feature points (three-dimensional coordinates (x,y,z)) showing features of the form of three-dimensional virtual clothing C positioned in a virtual space.

4. Conclusion

As described earlier, with the AR dressing system according to an embodiment of the present disclosure, virtual clothing C is reshaped based on a comparison result for the sizes of the subject A and the virtual clothing C and is then displayed overlaid on the subject A. By doing so, it is possible to achieve a more natural representation that enables the user to intuitively recognize the difference in size between the subject A and the virtual clothing C.

For example, if the virtual clothing C is smaller than the subject A, the virtual clothing C is reshaped so as to perfectly match the body shape of the subject A. Meanwhile, if the virtual clothing C is larger than the subject A, the virtual clothing C is reshaped so that the virtual clothing C as a whole sags in the direction of gravity.

It should be understood by those skilled in the art that various modifications, combinations, sub-combinations and alterations may occur depending on design requirements and other factors insofar as they are within the scope of the appended claims or the equivalents thereof.

In addition, although an example where virtual clothing is tried on has been mainly described for the AR dressing system described above, the items to be tried on are not limited to clothes and may be accessories such as eyeglasses, hats, and belts.

Also, although the case where the subject is a person has been described for the AR dressing system described earlier, the subject is not limited to a person and may be an animal such as a dog or a cat. In such case, it is possible to provide an AR dressing system that displays an image of pet clothing, for example, overlaid on a picked-up image in which an animal is captured.

Although an example where the subject A is a real object and the virtual clothing C is a virtual object has been given in the embodiment described above, the combination of real object and virtual object to be combined by the present embodiment is not limited to this example. The virtual object may be another object that can be made of a material capable of reshaping or deforming, such as fabric. As one example, furniture such as a chair, sofa, or bed can be given as the real object and a chair cover, sofa cover, or bed cover can be given as the virtual object.

A case where a virtual sofa cover is displayed overlaid on a picked-up image produced by capturing a sofa in a real space will now be described with reference to FIG. 11.

As shown in FIG. 11, by moving feature points on the outline of a virtual sofa cover in the direction of gravity, the display control unit 105 is capable of achieving a more natural representation of a state where the sofa cover has been actually placed on a sofa. Note that by considering that the sofa is placed on the floor when moving the feature points on the outline of the virtual sofa cover, the display control unit 105 is capable of displaying even more natural AR images.

Additionally, the present technology may also be configured as below.

(1)

An information processing apparatus including:

a comparing unit comparing a size of at least one of virtual clothing or accessories based on dimensions set in advance and a size of a subject that has been captured; and a display control unit reshaping at least one of the virtual clothing or accessories in accordance with a comparison result produced by the comparing unit and displaying at least one of the reshaped virtual clothing or accessories overlaid on the subject.

(2)

The information processing apparatus according to (1), wherein the display control unit reshapes at least one of the virtual clothing or accessories by moving feature points showing features of a form of at least one of the virtual clothing or accessories to feature points on an outline of the subject or in a direction of gravity.

(3)

The information processing apparatus according to (1) or (2), wherein the display control unit is operable when at least one of the virtual clothing or accessories is smaller than the subject, to reshape at least one of the virtual clothing or accessories so that an outline of at least one of the virtual clothing or accessories matches an outline of the subject.

(4)

The information processing apparatus according to any one of (1) to (3), wherein the display control unit is operable when at least one of the virtual clothing or accessories is larger than the subject, to reshape at least one of the virtual clothing or accessories so that an outline of at least one of the virtual clothing or accessories sags in a direction of gravity.

(5)

The information processing apparatus according to any one of (1) to (4), wherein the comparing unit compares sizes of at least one of the virtual clothing or accessories and the subject in one of two dimensions and three dimensions.

(6)

The information processing apparatus according to (2), wherein the feature points are one of two-dimensional coordinates and three-dimensional coordinates.

(7)

A display control method including:

comparing a size of at least one of virtual clothing or accessories based on dimensions set in advance and a size of a subject that has been captured; and reshaping at least one of the virtual clothing or accessories in accordance with a comparison result and displaying at least one of the reshaped virtual clothing or accessories overlaid on the subject.

(8)

A program causing a computer to execute:

a process comparing a size of at least one of virtual clothing or accessories based on dimensions set in advance and a size of a subject that has been captured; and a process reshaping at least one of the virtual clothing or accessories in accordance with a comparison result produced by the process of comparing and displaying at least one of the reshaped virtual clothing or accessories overlaid on the subject.

(9)

The program according to (8), wherein the process of reshaping reshapes at least one of the virtual clothing or accessories by moving feature points showing features of a form of at least one of the virtual clothing or accessories to feature points on an outline of the subject or in a direction of gravity.

(10)

The program according to (8) or (9), wherein the process of reshaping is operable when at least one of the virtual clothing or accessories is smaller than the subject, to reshape at least one of the virtual clothing or accessories so that an outline of at least one of the virtual clothing or accessories matches an outline of the subject.

(11)

The program according to any one of (8) to (10), wherein the process of reshaping is operable when at least one of the virtual clothing or accessories is larger than the subject, to reshape at least one of the virtual clothing or accessories so that an outline of at least one of the virtual clothing or accessories sags in a direction of gravity.

(12)

The program according to any one of (8) to (11), wherein the process of comparing compares sizes of at least one of the virtual clothing or accessories and the subject in one of two dimensions and three dimensions.

(13)

The program according to (8), wherein the feature points are one of two-dimensional coordinates and three-dimensional coordinates.

The present disclosure contains subject matter related to that disclosed in Japanese Priority Patent Application JP 2011-245305 filed in the Japan Patent Office on Nov. 9, 2011, the entire content of which is hereby incorporated by reference.

What is claimed is:

1. An information processing apparatus comprising:
a skeleton position calculating unit operable to determine skeleton positions of a subject appearing in an image captured by an imaging device;
a display control unit operable to dispose an object at a position in a virtual space according to the determined skeleton positions, wherein the object includes at least one of virtual clothing and virtual accessories, wherein a distance between the disposed position in the virtual space and a virtual imaging device is equal to a distance between a position of the subject in a real space and the imaging device; and
a comparing unit operable to compare a first size of the object disposed in the virtual space with a size of the subject that has been captured, wherein the size of the object is set in advance, wherein
the display control unit reshapes the object from the first size to a second size in accordance with a comparison result produced by the comparing unit and displays the reshaped object having the second size overlaid on the subject at the disposed position in the virtual space.

2. The information processing apparatus according to claim 1, wherein the display control unit reshapes the object to the second size by moving first feature points on an outline of the object in a direction of gravity, wherein the first feature points show features of a form of at least one of the virtual clothing or accessories.

3. The information processing apparatus according to claim 1, wherein the display control unit is operable, when at least the first size of one of the virtual clothing or accessories is smaller than the size of the subject, to reshape at least one of the virtual clothing or accessories to the second size so that an outline of at least one of the virtual clothing or accessories matches the outline of the subject.

4. The information processing apparatus according to claim 1, wherein the display control unit is operable, when at least the first size of one of the virtual clothing or accessories is larger than the size of the subject, to reshape at least one of the virtual clothing or accessories to the second size so that an outline of at least one of the virtual clothing or accessories moves downward in a direction of gravity.

5. The information processing apparatus according to claim 1, wherein the comparing unit compares the first size of at least one of the virtual clothing or accessories and the size of the subject in one of two dimensions and three dimensions.

6. The information processing apparatus according to claim 1, wherein the display control unit reshapes the object by moving first feature points on an outline of the object to second feature points on an outline of the subject and wherein the first feature point and the second feature point are one of two-dimensional coordinates and three-dimensional coordinates.

7. The information processing apparatus according to claim 1, wherein the one or more body parts of the subject are recognized based on depth information and feature amount information of a region of the image in which the captured subject is present.

8. A display control method comprising:
determining skeleton positions of a subject appearing in an image captured by an imaging device;
disposing an object at a position in a virtual space according to the determined skeleton positions, wherein the object include at least one of virtual clothing or virtual accessories, wherein a distance between the disposed position in the virtual space and a virtual imaging device is equal to a distance between a position of the subject in a real space and the imaging device;
comparing a first size of the object disposed in the virtual space with a size of the subject that has been captured, wherein the size of the object is set in advance;
reshaping the object from the first size to a second size in accordance with a comparison result; and
displaying the reshaped object having the second size overlaid on the subject at the disposed position in the virtual space.

9. The display control method according to claim 8, further comprising recognizing one or more body parts of the subject based on depth information and feature amount information of a region of the image in which the captured subject is present.

10. The display control method according to claim 9, wherein the region is recognized by determining a difference between an image which is captured before the subject appears and the image in which the captured subject is present.

11. A non-transitory computer-readable storage medium having stored thereon, a set of computer-executable instructions for causing a computer to execute steps comprising:
determining skeleton positions of a subject appearing in an image captured by an imaging device;
disposing an object at a position in a virtual space according to the determined skeleton positions, wherein the object includes at least one of virtual clothing and virtual accessories, wherein a distance between the disposed position in the virtual space and a virtual imaging device is equal to a distance between a position of the subject in a real space and the imaging device;
comparing a first size of the object disposed in the virtual space with a size of the subject that has been captured, wherein the size of the object is set in advance;
reshaping the object from the first size to a second size in accordance with a comparison result; and
displaying the reshaped object having the second size overlaid on the subject at the disposed position in the virtual space.

12. The non-transitory computer-readable storage medium according to claim 11, wherein the reshaping reshapes the object to the second size by moving first feature points on an outline of the object in a direction of gravity, wherein the first feature points show features of a form of at least one of the virtual clothing or accessories.

13. The non-transitory computer-readable storage medium according to claim 12, wherein the object is reshaped by moving first feature points on an outline of the object to second feature points on an outline of the subject and wherein the first feature point and the second feature point are one of two-dimensional coordinates and three-dimensional coordinates.

14. The non-transitory computer-readable storage medium according to claim 11, wherein the reshaping is operable, when at least the first size of one of the virtual clothing or accessories is smaller than the size of the subject, to reshape at least one of the virtual clothing or accessories to the second size so that an outline of at least one of the virtual clothing or accessories matches the outline of the subject.

15. The non-transitory computer-readable storage medium according to claim 11, wherein the reshaping is operable, when at least the first size of one of the virtual clothing or accessories is larger than the size of the subject, to reshape at least one of the virtual clothing or accessories to the second size so that an outline of at least one of the virtual clothing or accessories moves downward in a direction of gravity.

16. The non-transitory computer-readable storage medium according to claim 11, wherein the comparing compares the first size of at least one of the virtual clothing or accessories and the size of the subject in one of two dimensions and three dimensions.

* * * * *